(12) United States Patent
Ramirez (10) Patent No.: US 12,179,619 B2
(45) Date of Patent: Dec. 31, 2024

(54) SYSTEMS AND METHODS FOR PROACTIVE ELECTRONIC VEHICLE CHARGING

(71) Applicant: Allstate Insurance Company, Northbrook, IL (US)

(72) Inventor: Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 107 days.

(21) Appl. No.: 17/986,442

(22) Filed: Nov. 14, 2022

(65) Prior Publication Data

US 2024/0157828 A1 May 16, 2024

(51) Int. Cl.
*B60L 53/62* (2019.01)
*B60L 53/35* (2019.01)
*B60L 53/57* (2019.01)
*H02J 7/00* (2006.01)

(52) U.S. Cl.
CPC ............ *B60L 53/35* (2019.02); *B60L 53/57* (2019.02); *B60L 53/62* (2019.02); *H02J 7/0042* (2013.01); *H02J 7/0047* (2013.01)

(58) Field of Classification Search
CPC B60L 53/35; B60L 53/57; B60L 53/62; H02J 7/0042; H02J 7/0047
See application file for complete search history.

(56) References Cited

U.S. PATENT DOCUMENTS 10,046,962 B2  8/2018  Hall et al.
2012/0271758 A1 10/2012 Jammer
2018/0260887 A1  9/2018  Takatsuka et al.
2019/0263288 A1  8/2019  Nasu
2020/0262305 A1  8/2020  Chakraborty et al.
2021/0046829 A1  2/2021  Gaither et al.
2021/0318685 A1 10/2021  Jenkins et al.
2021/0404820 A1 12/2021  Schumacher
2022/0332210 A1 10/2022  Goei

FOREIGN PATENT DOCUMENTS

CN         113103893 A    7/2021
JP           5312440 B2   10/2013
WO    WO-2020199871 A1   10/2020

OTHER PUBLICATIONS

European Search Report for Application No. EP 23 20 9426 dated May 7, 2024 (14 pages).
Charging robots: Revolution in the underground parking garage, https://www.volkswagenag.com/en/news/stories/2019/12/volkswagen-lets-its-charging-robots-loose.html#, 4 pages, retrieved Jun. 4, 2022.

*Primary Examiner* — Mathew Franklin Gordon
(74) *Attorney, Agent, or Firm* — Polsinelli PC (57) ABSTRACT

Implementations claimed and described herein provide systems and methods for generating instructions for a mobile electric vehicle (EV) charging station to meet an EV at a particular time and place. In one implementation, EV trip data including a remaining range of the EV and an intended route of the EV is collected to determine a range of locations that the EV can stop at along its route without running out of power. Instructions to one of the locations are generated for a mobile EV charging station that is a best fit for arriving at the particular location and for the EV to reach the same location.

20 Claims, 7 Drawing Sheets

```
┌─────────────────────────────────────────────┐
│ TRAINIING A PREDICTION MODEL BASED ON A     │
│ TRAINING DATA SET INCLUDING MOBILE EV       │
│ CHARGING STATION DATA AND EV TRIP DATA,     │
│ WHEREIN THE EV TRIP DATA IS CAPTURED BY     │──505
│ AT LEAST ONE OF THE EV, AN ON-BOARD         │
│ DIAGNOSTIC (OBD) CONNECTED TO THE EV,       │
│ MOBILE DEVICE SENSORS, AND GROUND TRUTH     │
│ DATA REGARDING DRIVING AND VEHICLE ATTRIBUTES│
└─────────────────────────────────────────────┘
                     │
                     ▼
┌─────────────────────────────────────────────┐
│ TRACKING A GEOLOCATION OF THE EV BASED ON AT│
│ LEAST ONE OF TRACKING A CLIENT DEVICE       │──510
│ ASSOCIATED WITH THE EV AND RECEIVING        │
│ TELEMATICS SHARED FROM THE EV               │
└─────────────────────────────────────────────┘
                     │
                     ▼
┌─────────────────────────────────────────────┐
│ DYNAMICALLY ESTIMATING, BY THE TRAINED      │
│ PREDICTION MODEL, THE REMAINING RANGE OF    │
│ THE EV BASED ON AT LEAST ONE OF DRIVING     │──515
│ BEHAVIORS OF THE EV AND LEARNED             │
│ ENVIRONMENTAL FACTORS ALONG THE ROUTE       │
└─────────────────────────────────────────────┘
                     │
                     ▼
┌─────────────────────────────────────────────┐
│ UPDATING A SECOND SET OF DRIVING INSTRUCTIONS│
│ TO A NAVIGATION SYSTEM ASSOCIATED WITH THE EV│
│ AND THE AT LEAST ONE OF THE MOBILE DEVICE AND│──520
│ THE CHOSEN MOBILE EV CHARGING STATION        │
└─────────────────────────────────────────────┘
```

SYSTEMS AND METHODS FOR PROACTIVE ELECTRONIC VEHICLE CHARGING

FIELD

Aspects of the presently disclosed technology relate generally to proactive electronic vehicle (EV) charging and more particularly to deploying a mobile EV charging station to reach a geolocation based on unavailable EV charging stations along a route of an EV.

BACKGROUND

Trips taken by electric vehicles (EVs) are typically bound by where there are EV charging stations. Certain longer trips that do not have direct paths through larger cities with EV charging stations may have to take significantly longer routes to include one or more EV charging stops or EV charging stations that do exist may not be available due to maintenance or occupancy. Furthermore, drivers may make improper estimates that the EV can make it to their destination, when in fact many factors that drivers do not take into consideration may consume EV power in such a way that they actually cannot make it to their destination without a re-fill. With these observations in mind, among others, various aspects of the present disclosure were conceived and developed.

SUMMARY

Implementations described and claimed herein address the foregoing by providing systems and methods for mobile electric vehicle (EV) charging. In some implementations, trip data of an EV is received. The trip data includes a remaining range of the EV and a route of the EV, and the remaining range of the EV corresponds to a current power level of the EV. A prediction that the EV will have a power level below a threshold power level in an area along the route of the EV is generated based on the trip data, and a determination whether at least one EV charging station is available in the area along the route of the EV is generated. A mobile EV charging station of a plurality of mobile EV charging stations is identified when there is not an EV charging station available in the area along the route of the EV. The mobile EV charging station is deployed to a particular location relative to the route to meet the EV at a particular time.

In some implementations, a prediction is generated that an EV will have a power level below a threshold power level in an area in which EV charging stations are unavailable based on trip data of the EV. The trip data includes a remaining range of the EV and a route of the EV, and the remaining range of the EV corresponds to a current power level of the EV. A current location, a current charge level, and an availability of each of a plurality of mobile EV stations are determined. A mobile EV station is identified from the plurality of mobile EV stations for charging the EV based on the current location, the current charge level, and the availability of each of the plurality of mobile EV stations. A particular location for the mobile EV station to meet the EV for charging is determined. The mobile EV charging station is deployed to the particular location to meet the EV at a particular time.

In some implementations, a server is in communication with a first computing device associated with an EV over a network. The EV has a remaining range corresponding to a current power level of the EV and a route along which the EV is predicted to have a power level below a threshold power level in an area in which EV charging stations are unavailable. The server is in communication with a second computing device associated with a mobile EV station over the network. The server causes the mobile EV station to be deployed to a particular location to meet the EV at a particular time.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed descriptions are to be regarded as illustrative in nature and not limiting.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Disclosed are systems, apparatuses, methods, non-transitory computer-readable media, and circuits for generating instructions for a mobile charging station to meet the EV at a particular time and a particular location. According to at least one example, a method may include receiving, at one or more processors via a network, trip data of the EV including a remaining range of the EV and a route of the EV. In some examples, the method may include determining, at the one or more processors, that the EV will run out of power along the route at a location without an EV charging station. The method may further include determining, at the one or more processors, which mobile EV charging station of a plurality of mobile EV charging stations is a best fit for arriving at a particular location when the EV arrives at the particular location at a particular time. It will be appreciated that the particular time may be a window of times, an approximate time, a precise time, and/or the like, and the particular location may be a geographical area, geographical coordinates, a point of reference (e.g., a parking lot, a retail location, a gas station, etc.), and/or the like. The method may further include generating, at the one or more processors, a first set of driving instructions for the mobile EV charging station. The method may further include transmitting the first set of driving instructions to at least one of a mobile device and a chosen mobile EV charging station. As such, the technical field may be proactive electronic vehicle (EV) charging and the technical capability that is improved may be deploying a mobile EV charging station to reach a geolocation based on unavailable EV charging stations along a route of an EV.

A system can include one or more processors and at least one computer-readable storage medium storing instructions which, when executed by the one or more processors, cause the one or more processors to generate instructions for a mobile charging station to meet the EV at a particular time and place. A non-transitory computer-readable storage medium having stored therein instructions which, when executed by a computing system, cause the computing system to generate instructions for a mobile charging station to meet the EV at a particular time and place.

The disclosed technology addresses the need in the art for generating instructions for a mobile EV charging station to meet an electric vehicle (EV) at a particular time and place. EV charging stations are not as ubiquitous as gas stations and therefore, trips sometimes would need to plan for a detour at a charging station to have enough charge to make it to a final destination. As such, with a mobile EV charging station that can meet the EV along a shorter route, instructions for the mobile EV charging station are needed to be generated in a manner that efficiently captures the information necessary for sending the mobile EV charging station to the right location at a similar time as the EV.

Figure 1:
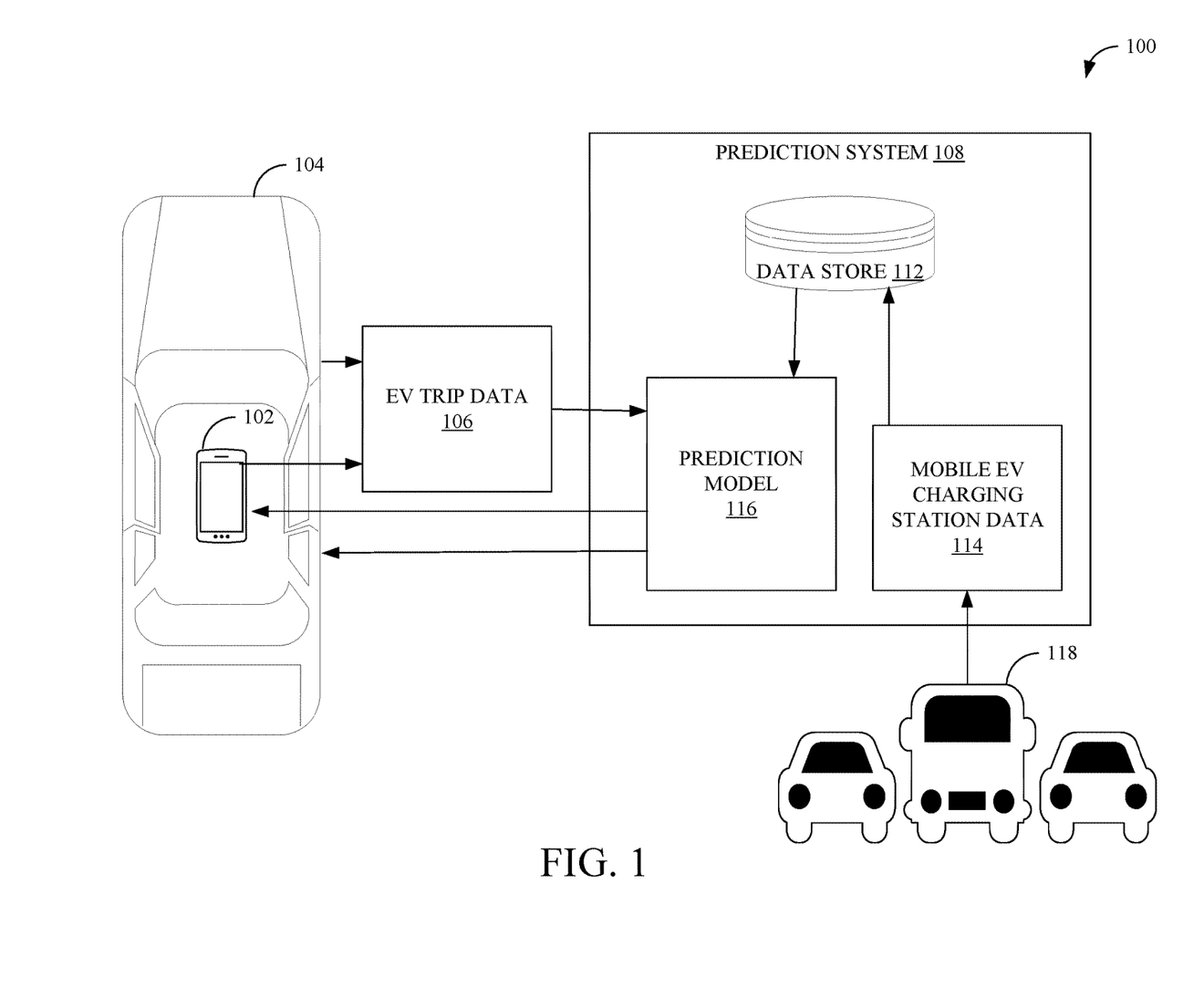
FIG. 1 illustrates an example diagram showing a prediction system for generating instructions for a mobile EV charging station to reach a geolocation based on missing EV charges along a route of an EV.

To begin a detailed description of an example diagram 100 showing a prediction system for generating instructions for a mobile EV charging station to reach a geolocation based on missing EV charges along a route of an EV, reference is made to FIG. 1. A mobile device 102, a telematics device or system associated with an EV 104, and/or the EV 104 itself, if the EV is a connected car for example, may collect EV trip data 106. EV trip data 106 may be collected from a global position system (GPS), micro-electro-mechanical system (MEMS) sensors, and other data logging tools. The telematics data captured can include location, speed, idling time, harsh acceleration or braking, vehicle faults, and more.

The EV trip data 106 may be sent to a prediction system 108 to ultimately generate directions for a mobile EV charging station 118. The prediction system 108 may comprise a remote processor, partially comprise the remote processor and use one or more processors on the mobile device 102, or fully generate the directions on one or more processors on the mobile device 102, a telematics device or system associated with an EV 104, and/or the EV 104 itself. If the prediction system 108 is remote, data sent to and from a mobile application may be via an application programming interface (API).

The EV trip data 106, which may include a remaining range of the EV and a route taken by the EV 104, may be sent to a prediction model 116. The prediction model 116 may also receive mobile EV charging station data 114, such as location data, from the mobile EV charging station 118, as well as other data from a data store 112 such as data associated with the environment of a route taken by the EV 104. The prediction model 116 may determine that the EV 104 will run out of power along a trip and generate instructions for the mobile EV charging station 118 to reach a particular location at a particular time to meet the EV 104. The particular location may be selected from a plurality of locations that are considered safe for charging. Safe locations may be identified based on generated safety heatmaps, which may be generated based on insurance claim data. The one or more locations determined for the mobile EV charging station 118 to meet the EV 104 may need to meet and/or pass a safety threshold. For example, certain parking lots that have a significant number of accidents would not be considered.

In some cases, the driver may have their own desired location that is different from the suggested location. The prediction system 108 may receive a command via an application on the client device 102 or on the EV 104 that indicates where the EV needs the chosen mobile EV charging station to be. Consequently, the set of driving directions may be updated, and the updated directions may be sent to another device associated with the chosen mobile EV charging station.

As such, the prediction model 116 may be trained to generate driving instructions for the mobile EV charging station 118 based on received EV trip data 106 and other data from the data store 112, such as mobile EV charging station data 114, including location data, remaining charge available, and safe locations. Furthermore, the prediction model 116 may be trained based on a training data set of mobile EV charging station data and/or EV trip data captured by the EV 104, an on-board diagnostic (OBD) connected to the EV 104, mobile device sensors, and/or other ground truth data regarding driving and vehicle attributes. The prediction model 116 may be trained by being penalized by utilizing a loss function to provide feedback to the prediction model to improve itself until the prediction model becomes a trained prediction model.

Figure 2:
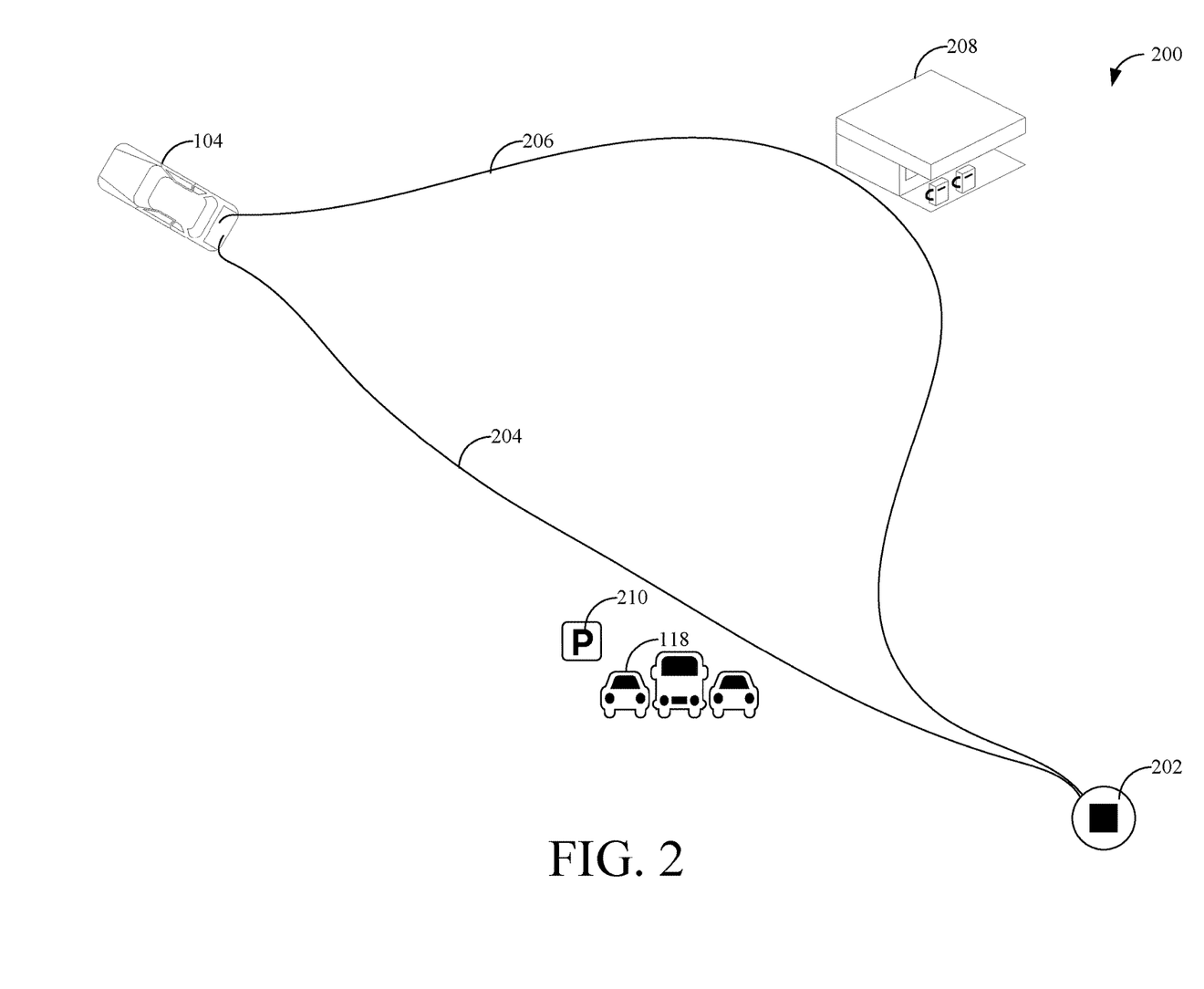
FIG. 2 illustrates an example schematic that may be displayed in an example graphical user interface (GUI) of a user device showing a longer trip that requires a detour to charge at a charging station versus a shorter trip that charges using a mobile EV charging station.

Turning to FIG. 2, the illustrated example diagram shows an example schematic 200 that may be displayed in an example graphical user interface (GUI) of a user device showing a longer trip that requires a detour to charge at a charging station versus a shorter trip that charges using the mobile EV charging station 118. The EV 104 may be planning to reach a destination 202 and a route 204 may be faster. However, given how much charge the EV 104 has left, the EV 104 would need to make a detour route 206 to charge at a charging station 208. This is an inefficient use of electricity and time. Therefore, in such a case, it would be advantageous to generate instructions for the mobile EV charging station 118 to meet the EV 104 along the route 204, such as in a nearby parking lot 210.

In some examples, a notification may be sent to the client device 102 that notifies that the EV 104 may not make it to its intended destination and requests permission to schedule a charging service at the particular location. If accepted, the client device 102 associated with a driver of the EV 104 may be connected with another device associated with the chosen mobile EV charging station 118 via a mobile application. Furthermore, a chat session may be set up between the client device 102 and the other device. In some cases, the EV 104 may be an autonomous vehicle (AV), and a navigation system of the EV 104 may be automatically notified to reroute a planned path to include the particular location.

In some cases, the location in which multiple EVs need mobile EV charging stations may become a hotspot such that a hotspot threshold associated with the location has been met. For example, if a certain number of EVs choose to charge with mobile EV charging stations at a same parking lot, the parking lot may be considered a hotspot. Consequently, one or more other mobile EV charging stations may be sent to be parked in the parking in anticipation of further EVs.

Figure 3:
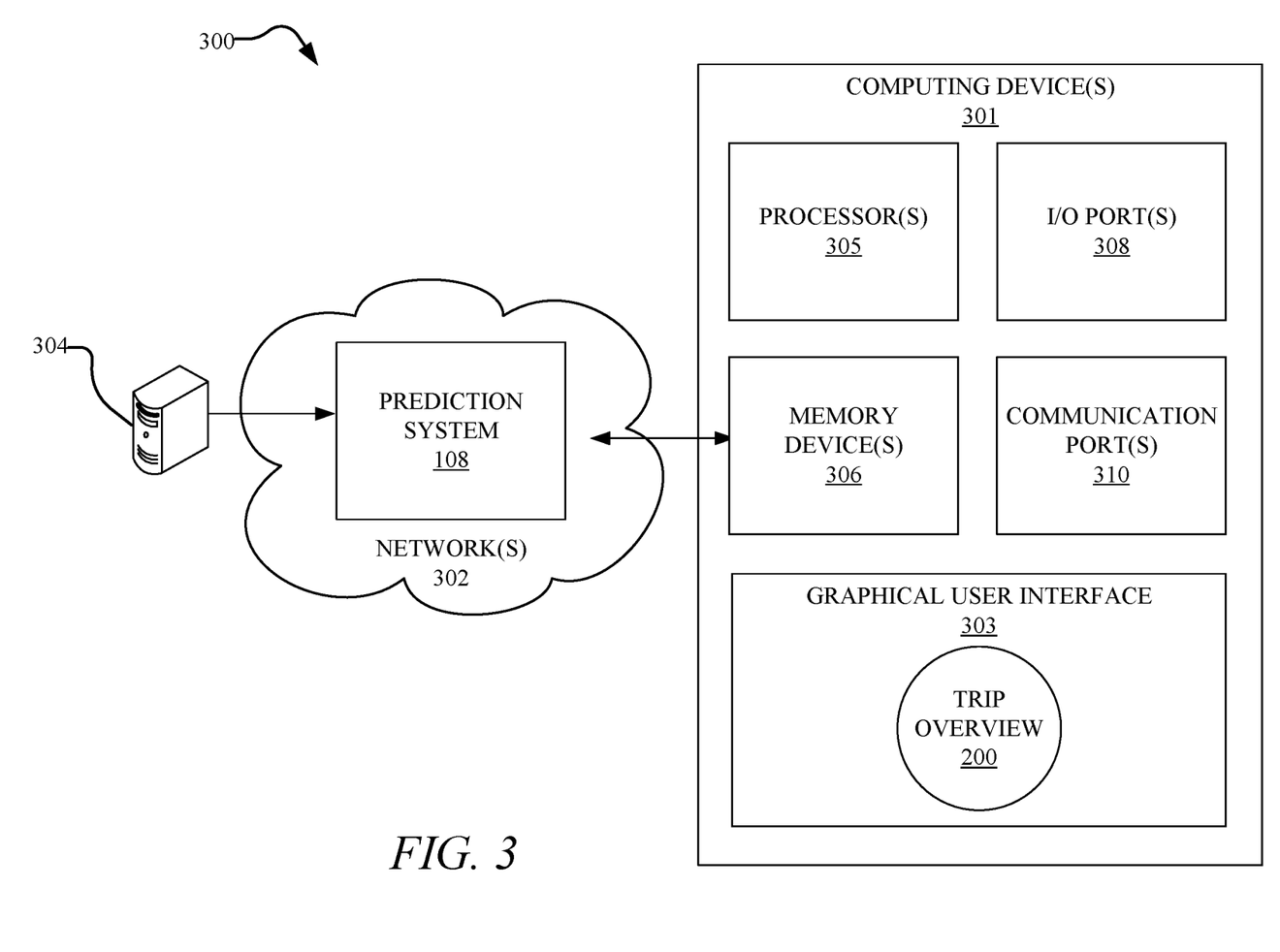
FIG. 3 illustrates an example network environment with one or more computing devices for generating instructions for the mobile EV charging station to reach the geolocation based on missing EV charges along the route of an EV.

FIG. 3 illustrates an example network environment 300 with one or more computing devices for generating instructions for a mobile EV charging station. The example network environment 300 includes the one or more network(s) 302 which can be a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 302 can include any type of network, such as the Internet, an intranet, a Virtual Private Network (VPN), a Voice over Internet Protocol (VoIP) network, a wireless network (e.g., Bluetooth), a cellular network, a satellite network, combinations thereof, etc. The network(s) 302 provide access to and interactions with systems to generate instructions for a mobile EV charging station. The network(s) 302 can include communications network components such as, but not limited to gateways routers, servers, and registrars, which enable communication across the network(s) 302. In one implementation, the communications network components include multiple ingress/egress routers, which may have one or more ports, in communication with the network(s) 302. Communication via any of the networks can be wired, wireless, or any combination thereof.

The network environment 300 may also include at least one server device 304 hosting software, application(s), websites, and the like for operating the prediction system 108 for generating instructions for a mobile EV charging station. The prediction system 108 can receive inputs from various computing devices and transform the received input data into other unique types of data. The server(s) 304 may be a single server, a plurality of servers with each such server being a physical server or a virtual machine, or a collection of both physical servers and virtual machines. In another implementation, a cloud hosts one or more components of the systems 100-300. The server(s) 304 may represent an instance among large instances of application servers in a cloud computing environment, a data center, or other computing environment. The server(s) 304 can access data stored at one or more database(s) (e.g., including any of the values or identifiers discussed herein). The systems 100-1000, the server(s) 304, and/or other resources connected to the network(s) 302 may access one or more other servers to access other websites, applications, web services interfaces, GUIs, storage devices, APIs, computing devices, or the like to perform the techniques discussed herein. The server(s) can include one or more computing device(s) 301, as discussed in greater detail below.

For instance, the network environment 300 can include the one or more computing device(s) 301 for executing the prediction system 108 and/or generating instructions for a mobile EV charging station. In one implementation, the one or more computing device(s) 301 include the one or more server device(s) 304 executing the prediction system 108 as a software application and/or a module or algorithmic component of software.

In some instances, the computing device(s) 301 can include a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 301 may be integrated with, form a part of, or otherwise be associated with the systems 100-300. It will be appreciated that specific implementations of these devices may be of differing possible specific computing architectures not all of which are specifically discussed herein but will be understood by those of ordinary skill in the art.

The computing device 301 may be a computing system capable of executing a computer program product to execute a computer process. Data and program files may be input to the computing device 301, which reads the files and executes the programs therein. Some of the elements of the computing device 301 include one or more hardware processors 305, one or more memory devices 306, and/or one or more ports, such as input/output (IO) port(s) 308 and communication port(s) 310. Additionally, other elements that will be recognized by those skilled in the art may be included in the computing device 301 but are not explicitly depicted in FIG. 1 or discussed further herein. Various elements of the computing device 301 may communicate with one another by way of the communication port(s) 310 and/or one or more communication buses, point-to-point communication paths, or other communication means.

The processor 305 may include, for example, a central processing unit (CPU), a microprocessor, a microcontroller, a digital signal processor (DSP), and/or one or more internal levels of cache. There may be one or more processors 305, such that the processor 305 comprises a single central-processing unit, or a plurality of processing units capable of executing instructions and performing operations in parallel with each other, commonly referred to as a parallel processing environment.

The computing device 301 may be a conventional computer, a distributed computer, or any other type of computer, such as one or more external computers made available via a cloud computing architecture. The presently described technology is optionally implemented in software stored on the data storage device(s) such as the memory device(s) 306, and/or communicated via one or more of the I/O port(s) 308 and the communication port(s) 310, thereby transforming the computing device 301 in FIG. 3 to a special purpose machine for implementing the operations described herein and generating instructions for a mobile EV charging station. Moreover, the computing device 301, as implemented in the systems 100-300, receives various types of input data (e.g., in different data formats) and transforms the input data through the stages of the data flow described herein into new types of data files (e.g., instructions for the mobile EV charging station). Moreover, these new data files are transformed to enable the computing device 301 to do something it could not do before—generate the trip overview 200 in the GUI 303.

The one or more memory device(s) 306 may include any non-volatile data storage device capable of storing data generated or employed within the computing device 301, such as computer executable instructions for performing a computer process, which may include instructions of both application programs and an operating system (OS) that manages the various components of the computing device 301. The memory device(s) 306 may include, without limitation, magnetic disk drives, optical disk drives, solid state drives (SSDs), flash drives, and the like. The memory device(s) 306 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 306 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 306 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 301 includes one or more ports, such as the I/O port(s) 308 and the communication port(s) 310, for communicating with other computing or network devices. It will be appreciated that the I/O port 308 and the communication port 310 may be combined or separate and that more or fewer ports may be included in the computing device 301.

The I/O port 308 may be connected to an I/O device, or other device, by which information is input to or output from the computing device 301. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 301 via the I/O port 308. Similarly, the output devices may convert electrical signals received from the computing device 301 via the I/O port 308 into signals that may be sensed as output by a human, such as sound, light, and/or touch. The input device may be an alphanumeric input device, including alphanumeric and other keys for communicating information and/or command selections to the processor 305 via the I/O port 308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 310 is connected to the network 302 so the computing device 301 can receive network data useful in executing the methods and systems set out herein as well as transmitting information and network configuration changes determined thereby. Stated differently, the communication port 310 connects the computing device 301 to one or more communication interface devices configured to transmit and/or receive information between the computing device 301 and other devices (e.g., network devices of the network(s) 302) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 310 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 310 may communicate with an antenna or other link for electromagnetic signal transmission and/or reception.

In an example, the prediction system 108 and/or other software, modules, services, and operations discussed herein may be embodied by instructions stored on the memory devices 306 and executed by the processor 305.

The system 300 set forth in FIG. 3 is but one possible example of a computing device 301 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 301.

Figure 4:
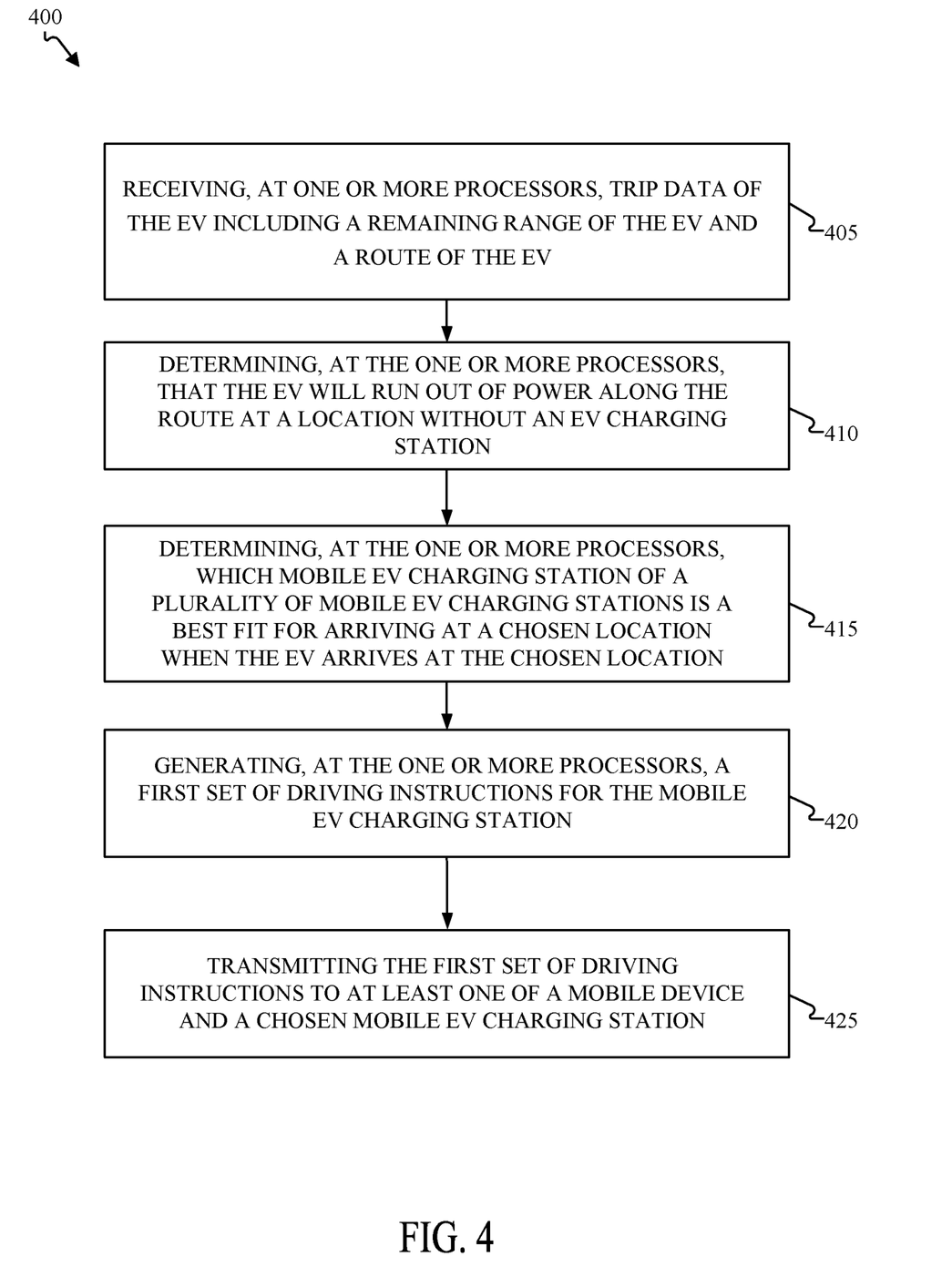
FIG. 4 illustrates example operations for generating instructions for the mobile EV charging station to reach the geolocation based on missing EV charges along the route of an EV.

FIG. 4 depicts an example method 400 for generating instructions for the mobile EV charging station to reach the geolocation based on missing EV charges along the route of an EV, which can be performed by any of the systems 100-300 and/or network environment 300. At operation 405, the method 400 includes receiving, at one or more processors via a network, trip data of the EV 104 including a remaining range of the EV 104 and a route of the EV 104. Other kinds of trip data may include how the driver is driving the EV 104 such that calculations can be made to predict how quickly the EV power is being used. For example, hard braking and accelerations exhaust EV power more quickly than if they were avoided. At operation 410, the method 400 includes determining, at the one or more processors, that the EV will run out of power along the route at a location without an EV charging station. The determination will need information about the intended route and destination which may be inputted by the driver before the ride or received from inputs at the EV 104. If the chosen route is already taking into consideration that a detour needs to be made, the prediction system 108 may suggest the quicker route and determine the location based on the quicker route.

At operation 415, the method 400 includes determining, at the one or more processors, which mobile EV charging station of a plurality of mobile EV charging stations is a best fit for arriving at a particular location when the EV arrives at the particular location. Such a determination may be based on numerous factors such as a distance between the plurality of mobile EV charging stations and the location, how much charge remains in each mobile EV charging station, and environmental factors such as traffic between each mobile EV charging station and the location. Furthermore, such factors may also be determinative for determining the location. For example, if one of the locations is far from mobile EV charging stations, or there is too much traffic between the mobile EV charging stations and the location, such that no mobile EV charging station would reach the location in time, such a location would not be selected. At operation 420, the method 400 includes generating, at the one or more processors, a first set of driving instructions for the mobile EV charging station, and at operation 425, the method 400 includes transmitting the first set of driving instructions to at least one of a mobile device and a chosen mobile EV charging station. The driving instructions may be in the form of a GPS navigation instructions with turn-by-turn voice-guided instructions along with a GPS satellite connection to determine its location. If the EV 104 or the mobile EV charging station 118 is an autonomous vehicle, the instructions may be sent directly to the EV 104 or the mobile EV charging station 118 as automated driving instructions.

Figure 5:
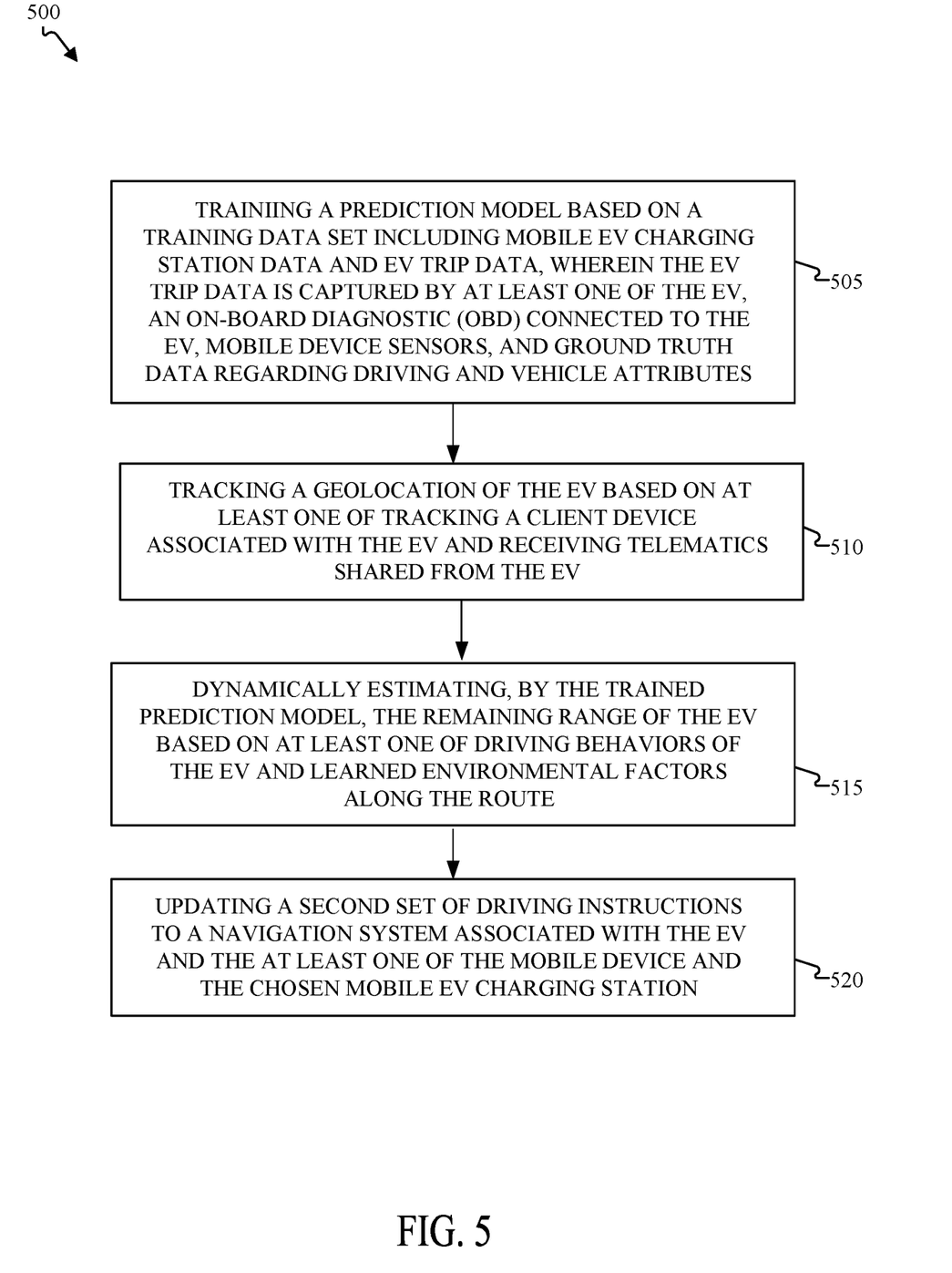
FIG. 5 illustrates example operations for dynamically estimating the remaining range of the EV.

FIG. 5 depicts an example method 500 for dynamically estimating the remaining range of the EV, which can be performed by any of the systems 100-300 and/or network environment 300. At operation 505, the method 500 includes training a prediction model based on a training data set including mobile EV charging station data and EV trip data. The prediction model may be penalized by utilizing a loss function to provide feedback to the prediction model to improve the prediction model until a trained prediction model is generated. The EV trip data may be captured by at least one of the EV, an on-board diagnostic (OBD) connected to the EV, mobile device sensors, and ground truth data regarding driving and vehicle attributes. The trained prediction model may then receive new EV trip data as inputs to dynamically predict where the location that the EV 104 and the mobile EV charging station 118 should meet. One of the determining factors of whether the location should be is how much remaining charge is left in the EV.

At operation 510, the method 500 includes tracking a geolocation of the EV 104 based on at least one of tracking a client device associated with the EV and receiving telematics shared from the EV. The tracking may indicate that the prediction of how far the EV 104 will be able to travel on the remaining charge is off because, for example, there is now traffic that is causing a delay and the EV 104 is performing a lot of hard breaks and there may be a headwind causing a reduction in range or an increase in energy used per mile. As such, the originally determined location may no longer be ideal. At operation 515, the method 500 includes dynamically estimating, by trained the prediction model, the remaining range of the EV based on at least one of driving behaviors of the EV and learned environmental factors along the route. The newly estimated remaining range may then determine another set of locations for charging that may be better options. The particular location may then be updated to one of the better options. At operation 520, the method 500 includes updating a second set of driving instructions to a navigation system associated with the EV and the at least one of the mobile device and the chosen mobile EV charging station.

Figure 6:
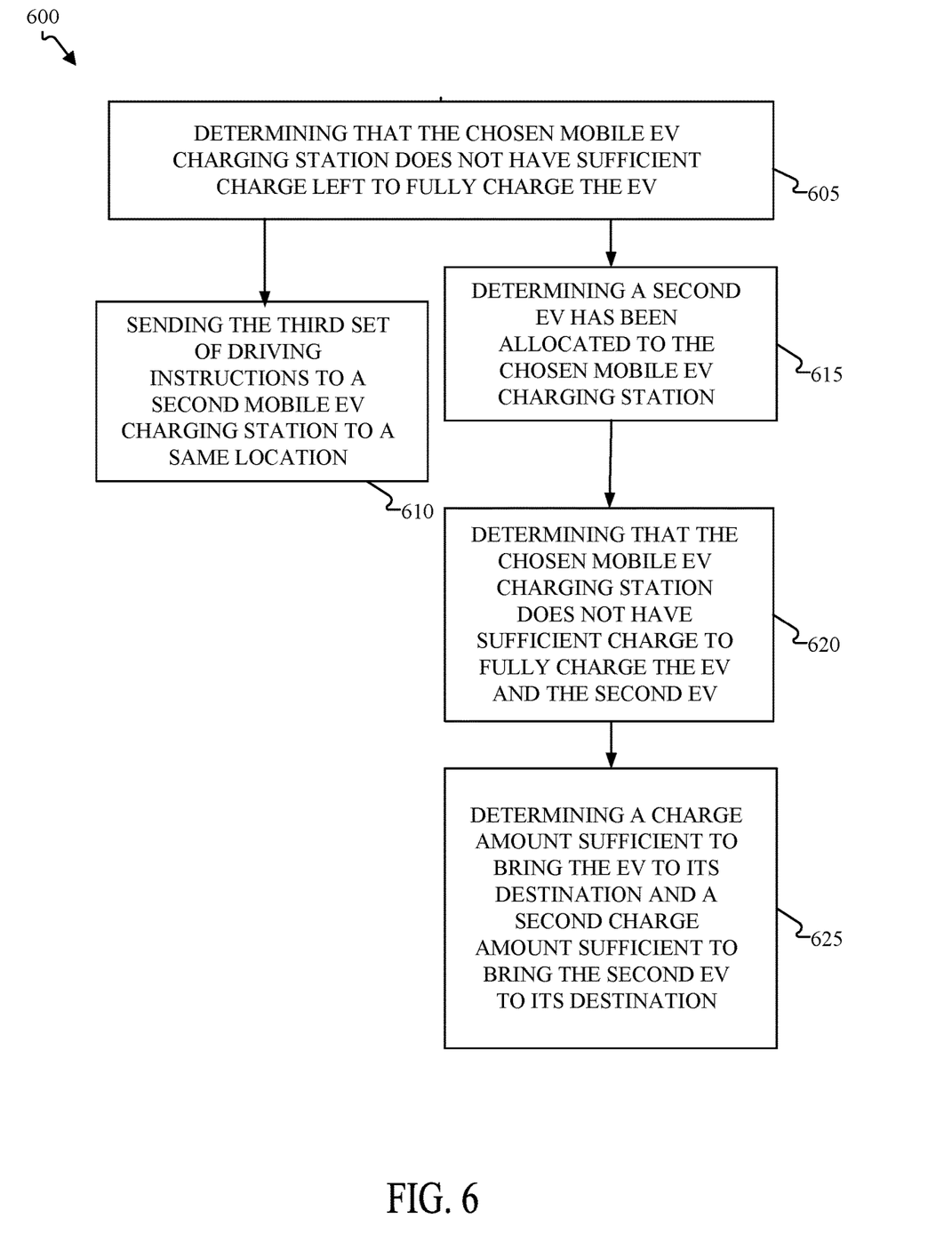
FIG. 6 illustrates example operations for determining when to send a third set of driving instructions to a second mobile EV charging station.

FIG. 6 depicts an example method 600 for determining when to send a third set of driving instructions to a second mobile EV charging station, which can be performed by any of the systems 100-300 and/or network environment 300. In some cases, the chosen mobile EV charging station may not have sufficient charge left. For example, there was another EV that arrived before the EV 104 and there is not enough for both, but there is enough time for a second nearby mobile EV charging station to arrive before the EV 104. At operation 605, the method 600 includes determining that the chosen mobile EV charging station does not have sufficient charge left to fully charge the EV. At operation 610, the method 600 includes sending a third set of driving instructions to a second mobile EV charging station. The third set of driving instructions would bring the second mobile EV charging station to the same location. Furthermore, a network of EV charging stations may be called to different locations along the route of the EV, e.g, a networking of EV charging stations to allow for stone stepping through the route, or until fixed EV charging stations become available along the route again.

In other cases, the EV 104 is not fully charged and is just charged to get the EV 104 to their intended destination. For example, at operation 615, the method 600 includes determining a second EV has been allocated to the chosen mobile EV charging station. At operation 620, the method 600 includes determining that the chosen mobile EV charging station does not have sufficient charge to fully charge the EV and the second EV. At operation 625, the method 600 includes determining a charge amount sufficient to bring the EV to its destination and a second charge amount sufficient to bring the second EV to its destination. In the case that another mobile EV charging station cannot come, a split in the charge would have to be made such that neither would receive a full charge but both would have sufficient charge to get to their intended destination.

Figure 7:
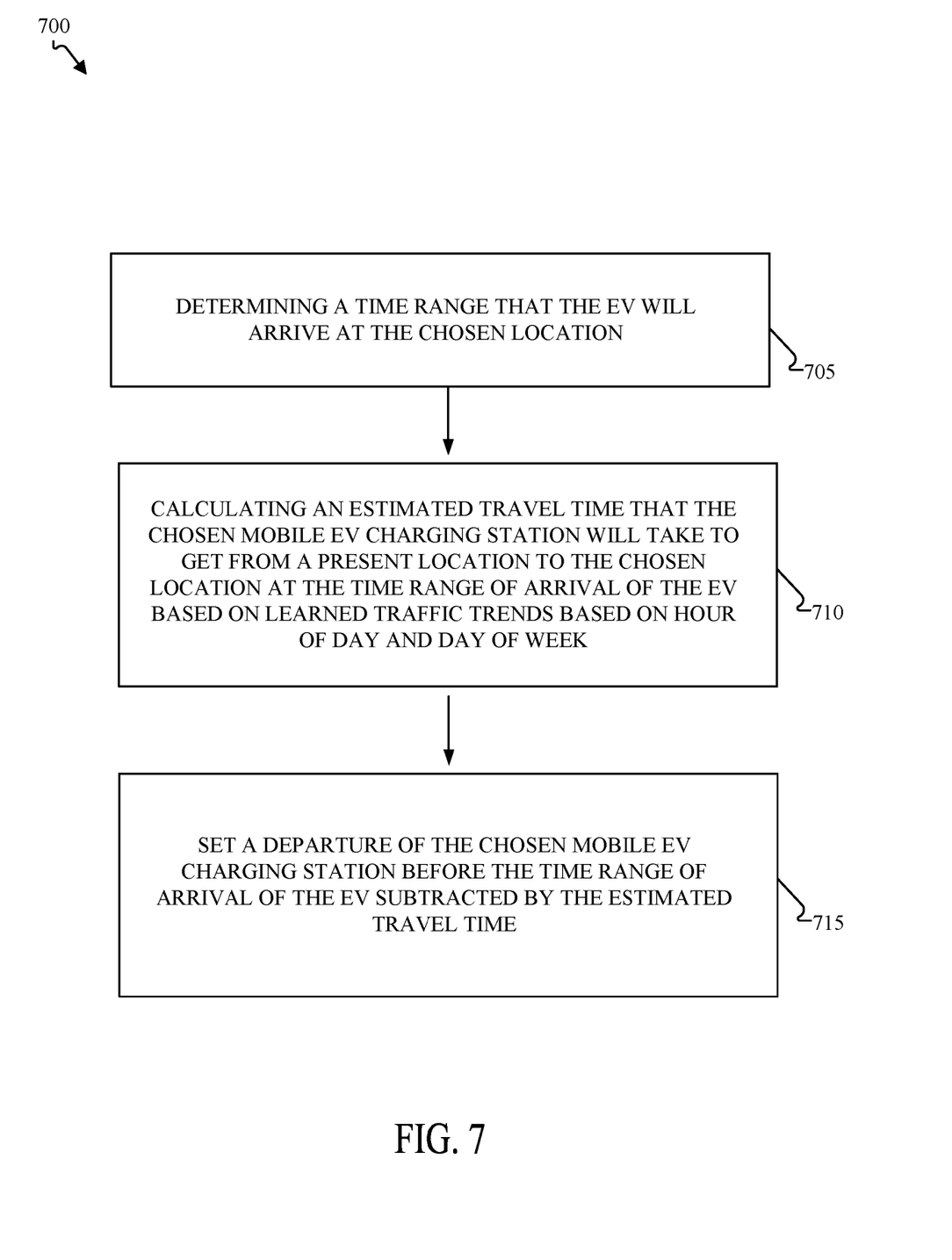
FIG. 7 illustrates example operations for setting a departure of the chosen mobile EV charging station.

FIG. 7 depicts an example method 700 for setting a departure of the chosen mobile EV charging station, which can be performed by any of the systems 100-300 and/or network environment 300. At operation 705, the method 700 includes determining a time range that the EV will arrive at the particular location. The time range may take factors such as possible traffic and driving trends associated with the driver. At operation 710, the method 700 includes calculating an estimated travel time that the chosen mobile EV charging station will take to get from a present location to the particular location at the time range of arrival of the EV based on learned traffic trends based on hour of day and day of week. The calculation may also be performed dynamically as the EV 104 is driving towards the location. At operation 715, the method 700 includes setting a departure of the chosen mobile EV charging station before the time range of arrival of the EV subtracted by the estimated travel time. The departure may be set to arrive at the location based on a standardized buffer time period. It is also possible that the EV 104 will be set to arrive before the chosen mobile EV charging station because no available mobile EV charging stations could get there for the EV 104. In such a case, the driver of the EV 104 would be notified of the delay. If the delay is such that it would be faster to take the detour route to a charging station, the driver of the EV 104 would be notified as such. If this is determined before the suggestion is made to take the shorter route avoiding the charging station, the suggestion would not be made and the notification would not be sent. Furthermore, notifications may be sent to the driver of the EV or the EV itself, particularly when the EV is an autonomous or semi-autonomous vehicle.

It is to be understood that the specific order or hierarchy of operations in the methods depicted in FIGS. 4-7 and throughout this disclosure are instances of example approaches and can be rearranged while remaining within the disclosed subject matter. For instance, any of the operations depicted in FIGS. 4-7 may be omitted, repeated, performed in parallel, performed in a different order, and/or combined with any other of the operations depicted in FIG. 4-7 or discussed herein.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A computer-implemented method for mobile electric vehicle (EV) charging, the computer-implemented method comprising:
    receiving, at one or more processors, trip data of an EV, the trip data including a remaining range of the EV and a route of the EV, the remaining range of the EV corresponding to a current power level of the EV;
    predicting, at the one or more processors, that the EV will have a power level below a threshold power level in an area along the route of the EV based on the trip data;
    determining, at the one or more processors, whether at least one EV charging station is available in the area along the route of the EV;
    identifying, at the one or more processors, a mobile EV charging station of a plurality of mobile EV charging stations when the at least one EV charging station is unavailable in the area along the route of the EV; and
    directing the mobile EV charging station to a particular location relative to the route to meet the EV at a particular time.

2. The computer-implemented method of claim 1, further comprising:
    identifying one or more locations within a set distance along the route; and
    selecting the particular location from the one or more locations.

3. The computer-implemented method of claim 1, further comprising:
    connecting, through a network, a client device associated with a driver of the EV with a device associated with the mobile EV charging station via a mobile application; and
    initiating a communication session between the client device and the device associated with the mobile EV charging station.

4. The computer-implemented method of claim 1, further comprising:
    sending a notification to a client device associated with a driver of the EV, the notification including an alert that the EV will have the power level below the threshold power level in the area along the route of the EV and a prompt to schedule a charging service at the particular location.

5. The computer-implemented method of claim 1, wherein the EV is an autonomous vehicle (AV), the computer-implemented method further comprising:
    automatically notifying a navigation system of the AV to reroute a planned path along the route to arrive at the particular location at the particular time.

6. The computer-implemented method of claim 1, further comprising:
tracking a geolocation of the EV based on at least one of tracking a client device associated with the EV or receiving telematics data associated with the EV, the particular location determined based on the geolocation of the EV.

7. The computer-implemented method of claim 1, wherein the remaining range of the EV is dynamically estimated based on at least one of driving behavior of the EV or learned environmental factors along the route.

8. The computer-implemented method of claim 1, further comprising:
generating a comparison of a charge level of the mobile EV charging station with an amount of charge needed to replenish the power level of the EV; and
determining whether to deploy a second mobile EV charging station to the particular location at the particular time based on the comparison.

9. The computer-implemented method of claim 1, further comprising:
assigning a second EV to the mobile EV charging station; and
allocating a first amount of charge from the mobile EV charging station to the EV and a second amount of charge from the EV to the second EV.

10. The computer-implemented method of claim 1, further comprising:
determining the particular location has passed a hotspot threshold; and
deploying one or more other mobile EV charging stations of the plurality of mobile EV charging stations to the particular location.

11. The computer-implemented method of claim 1, further comprising:
adjusting the particular location based on at least one of input from a client device, the current power level of the EV, or a current location of the EV.

12. The computer-implemented method of claim 1, further comprising:
identifying a current location and a current availability of the mobile EV charging station; and
setting a departure time from the current location of the mobile EV charging station to reach the particular location by the particular time.

13. One or more tangible non-transitory computer-readable storage media storing computer-executable instructions for performing a computer process on a computing system, the computer process comprising:
generating a prediction that an EV will have a power level below a threshold power level in an area in which EV charging stations are unavailable based on trip data of the EV, the trip data including a remaining range of the EV and a route of the EV, the remaining range of the EV corresponding to a current power level of the EV;
determining a current location of each of a plurality of mobile EV stations;
determining a current charge level of each of the plurality of mobile EV stations;
determining an availability of each of the plurality of mobile EV stations;
identifying a mobile EV charging station from the plurality of mobile EV stations for charging the EV based on the current location, the current charge level, and the availability of each of the plurality of mobile EV stations;
determining a particular location for the mobile EV charging station to meet the EV for charging; and
requesting the mobile EV charging station to meet the EV at a particular time and at the particular location.

14. The one or more tangible non-transitory computer-readable storage media of claim 13, wherein the particular location is determined based on the remaining range of the EV and the route of the EV.

15. The one or more tangible non-transitory computer-readable storage media of claim 14, wherein the particular location is further determined based on a comparison of a safety level of the particular location to a safety threshold.

16. The one or more tangible non-transitory computer-readable storage media of claim 14, wherein the particular location is further determined based on a second remaining range of a second EV and a second route of a second EV, the mobile EV charging station being further identified for charging the second EV.

17. The one or more tangible non-transitory computer-readable storage media of claim 13, further comprising:
determining a departure time for the mobile EV charging station to reach the particular location by the particular time; and
causing the mobile EV charging station to depart by the departure time.

18. A system for mobile electric vehicle (EV) charging, the system comprising:
a server in communication with a first computing device associated with an EV over a network, the EV having a remaining range corresponding to a current power level of the EV and a route along which the EV is predicted to have a power level below a threshold power level in an area in which EV charging stations are unavailable, the server in communication with a second computing device associated with a mobile EV station over the network, the server causing the mobile EV station to be deployed to a particular location to meet the EV at a particular time.

19. The system of claim 18, wherein the server tracks a current location of the mobile EV station using the second computing device and sends at least one of the current location of the mobile EV station or an estimated time of arrival of the mobile EV station at the particular location to the first computing device.

20. The system of claim 18, wherein at least one of the particular location or the particular time are dynamically adjusted.

* * * * *